(12) United States Patent
Han et al.

(10) Patent No.: US 11,176,395 B2
(45) Date of Patent: Nov. 16, 2021

(54) IMAGE RECOGNITION PROCESSOR INCLUDING FUNCTIONAL SAFETY PROCESSOR CORE AND OPERATION METHOD THEREOF

(71) Applicant: ELECTRONICS AND TELECOMMUNICATIONS RESEARCH INSTITUTE, Daejeon (KR)

(72) Inventors: Jin Ho Han, Seoul (KR); Young-Su Kwon, Daejeon (KR); Yong Cheol Peter Cho, Daejeon (KR); Min-Seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 16/694,899

(22) Filed: Nov. 25, 2019

(65) Prior Publication Data

US 2020/0175293 A1 Jun. 4, 2020

(30) Foreign Application Priority Data

Nov. 30, 2018 (KR) .................. 10-2018-0153135
Feb. 21, 2019 (KR) .................. 10-2019-0020775

(51) Int. Cl.
*G06K 9/03* (2006.01)
*G06F 1/06* (2006.01)
(Continued)

(52) U.S. Cl.
CPC ............. *G06K 9/03* (2013.01); *G06F 1/06* (2013.01); *G06F 11/1415* (2013.01);
(Continued)

(58) Field of Classification Search
None
See application file for complete search history.

(56) References Cited

U.S. PATENT DOCUMENTS

| | | |
|---|---|---|
| 6,591,335 B1 | 7/2003 | Sade et al. |
| 7,966,514 B2 * | 6/2011 | Surasinghe ......... G06F 11/2025 714/4.2 |

(Continued)

FOREIGN PATENT DOCUMENTS

| | | |
|---|---|---|
| KR | 1020130119452 A | 10/2013 |
| KR | 1020160046225 A | 4/2016 |
| KR | 1020160133923 A | 11/2016 |

*Primary Examiner* — Anand P Bhatnagar

(57) ABSTRACT

Provided is an image recognition processor. The image recognition processor includes a plurality of nano cores arranged in rows and columns and configured to perform a pattern recognition operation on an input feature using a kernel coefficient in response to each instruction, an instruction memory configured to provide the instruction to each of the plurality of nano cores, a feature memory configured to provide the input feature to each of the plurality of nano cores, a kernel memory configured to provide the kernel coefficients to the plurality of nano cores, and a functional safety processor core configured to receive a result of a pattern recognition operation outputted from the plurality of nano cores to detect the presence of a recognition error, and perform a fault tolerance function on the detected recognition error.

15 Claims, 7 Drawing Sheets

(51) Int. Cl.
*G06F 11/14* (2006.01)
*G06T 1/60* (2006.01)
*G06K 9/00* (2006.01)
*B60W 50/14* (2020.01)

(52) U.S. Cl.
CPC ............ *G06K 9/00986* (2013.01); *G06T 1/60*
(2013.01); *B60W 50/14* (2013.01); *G06F 2201/805* (2013.01)

(56) References Cited

U.S. PATENT DOCUMENTS

| | | | |
|---|---|---|---|
| 8,051,247 | B1 | 11/2011 | Favor et al. |
| 8,084,762 | B2 * | 12/2011 | Tran ................ G11C 13/02 257/5 |
| 9,823,983 | B2 * | 11/2017 | Baca ................ G06F 11/1641 |
| 9,830,218 | B2 * | 11/2017 | Han ................ G06F 12/0895 |
| 9,927,391 | B2 * | 3/2018 | Tran ................ G01N 33/0034 |
| 10,489,520 | B2 * | 11/2019 | Cho ................ G06F 11/261 |
| 10,949,347 | B2 * | 3/2021 | Brewer ............ G06F 12/0811 |
| 10,983,878 | B2 * | 4/2021 | Han ................ G06F 11/165 |
| 10,984,882 | B2 * | 4/2021 | Chu ................ G06F 11/0727 |
| 2010/0073995 | A1 * | 3/2010 | Tran ................ H01L 45/1233 365/151 |
| 2012/0166832 | A1 * | 6/2012 | Henry ................ G06F 1/3296 713/320 |
| 2016/0092320 | A1 * | 3/2016 | Baca ................ G06F 11/1641 714/49 |
| 2016/0334467 | A1 * | 11/2016 | Cho ................ G06F 30/33 |
| 2020/0167245 | A1 * | 5/2020 | Han ................ G06K 9/036 |

\* cited by examiner

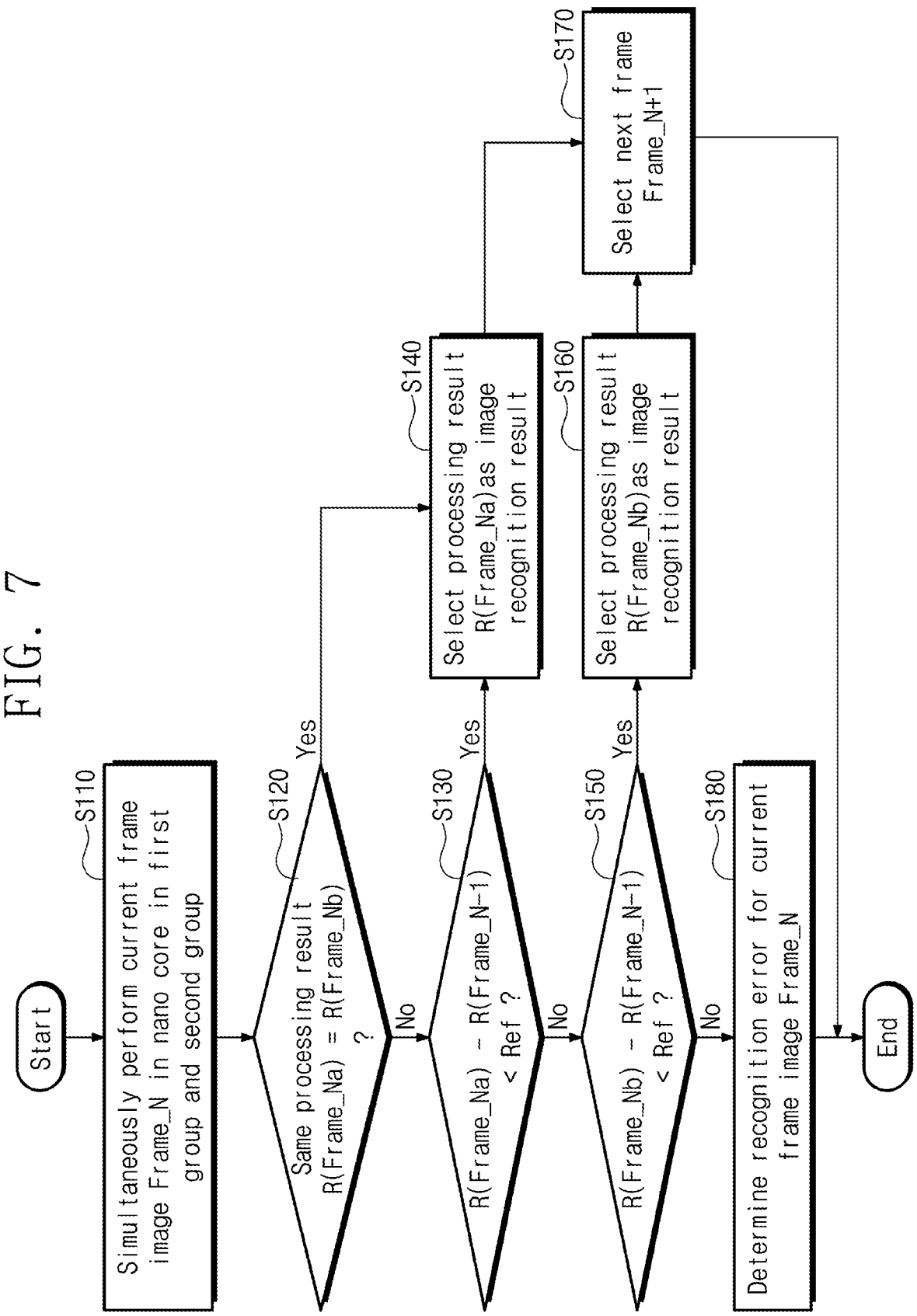

IMAGE RECOGNITION PROCESSOR INCLUDING FUNCTIONAL SAFETY PROCESSOR CORE AND OPERATION METHOD THEREOF

CROSS-REFERENCE TO RELATED APPLICATIONS

This U.S. non-provisional patent application claims priority under 35 U.S.C. § 119 of Korean Patent Application Nos. 10-2018-0153135, filed on Nov. 30, 2018, and 10-2019-0020775, filed on Feb. 21, 2019, the entire contents of which are hereby incorporated by reference.

BACKGROUND

The present disclosure herein relates to an electronic device, and more particularly, to an image recognition processor including a functional safety processor core for performing an error detection and error prevention function for a recognized pattern and an operation method thereof.

Recently, the development of a system requiring a high degree of intelligence and precision for Advanced Driver Assistance System (ADAS) or autonomous driving has been actively performed in automobiles and various transportation systems. Especially, in order to control vehicles by analyzing the recognition of the external environment and the inputs of the recognized image, voice, or sensors, performance for analyzing and processing large amounts of data in real time is required. In these systems, since even minor recognition errors may cause large accidents, reliability of the processor system that performs the recognition of sensor data is particularly important.

In such a way, devices that process sensor data and recognize the pattern thereof should be designed to include fault tolerance to operate in harsh environments such as automobiles and airplanes. In pattern recognition systems such as deep neural network systems, a distributed computing technique that uses a large number of CPU cores is used. Especially, a technique that may detect recognition errors due to various errors or defects and recover the detected recognition errors still requires much research.

SUMMARY

The present disclosure provides an image recognition processor having a function of detecting an operation error of a processor recognizes a pattern by processing sensor data in a semiconductor and of tolerating the detected errors by using the characteristics of sensor data processing results.

An embodiment of the inventive concept provides an image recognition processor including: a plurality of nano cores arranged in rows and columns and configured to perform a pattern recognition operation on an input feature using a kernel coefficient in response to each instruction; an instruction memory configured to provide the instruction to each of the plurality of nano cores; a feature memory configured to provide the input feature to each of the plurality of nano cores; a kernel memory configured to provide the kernel coefficients to the plurality of nano cores; and a functional safety processor core configured to receive a result of a pattern recognition operation outputted from the plurality of nano cores to detect the presence of a recognition error, and perform a fault tolerance function on the detected recognition error, wherein the functional safety processor core includes: a first processor driven by a first driving voltage and a first driving clock; and a second processor driven by a second driving voltage and a second driving clock and configured to perform the same task as the first processor, wherein each of the first driving voltage and the second driving voltage is supplied from mutually independent voltage regulators, and each of the first driving clock and the second driving clock is provided from mutually independent clock generators.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 7 is a flowchart illustrating a recognition error detection and fault tolerance method according to an embodiment of the inventive concept.

DETAILED DESCRIPTION

Hereinafter, it will be described in more detail with reference to the accompanying drawings so that those skilled in the art easily carry out the technical idea of the inventive concept.

Figure 1:
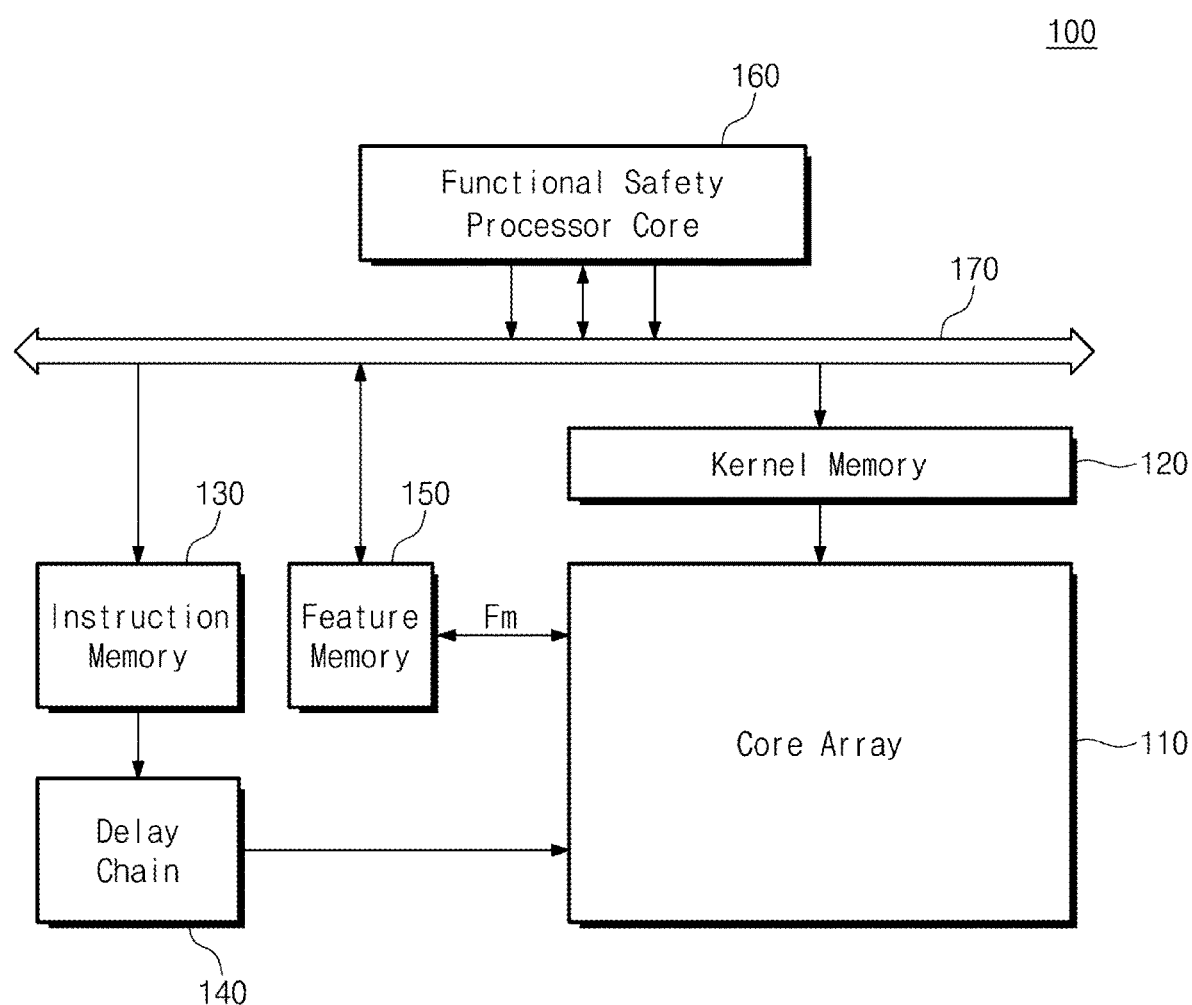
FIG. 1 is a block diagram schematically illustrating an image recognition processor according to an embodiment of the inventive concept.

FIG. 1 is a block diagram schematically illustrating a structure of an image recognition processor according to an embodiment of the inventive concept. Referring to FIG. 1, the image recognition processor 100 of the inventive concept includes a core array 110, a kernel memory 120, an instruction memory 130, a delay chain 140, a feature memory 150, a functional safety processor core 160, and a bus 170.

The core array 110 processes the input data Fm provided from the feature memory 150 using the instruction and kernel information provided by the instruction memory 130 and the kernel memory 120. For example, when the sensed image is received, the core array 110 performs processing using an instruction and a kernel to identify a pattern of the sensed image. For example, the core array 110 may perform convolution operations or down-sampling operations such as pooling.

In particular, the core array 110 may include a plurality of Nano Cores (NCs) arranged in rows and columns for processing a convolution operation or a pooling operation. The NCs may process the provided features in a parallel processing or a sequential processing. In the inventive concept, a plurality of NCs may be controlled to process the same operation with a specific delay time. Then, the result of the pattern recognition operation processed in the plurality of NCs at regular time intervals may be provided to the functional safety processor core 160 through the feature memory 150. The plurality of NCs included in the core array 110 may be divided into groups. Then, the NCs of each group unit may perform pattern recognition operations on the same image or different images.

The kernel memory 120 provides a plurality of kernel information to the core array 110 in synchronization with instructions provided to the core array 110. For convolution operations performed in the core array 110, the kernel memory 120 may provide various parameters necessary for kernel information, coefficients, bias addition, activation, pooling, and the like. The kernel memory 120 may provide kernel coefficients in units of columns to the NCs of the core array 110, for example. Then, each of the NCs may perform a pattern recognition operation using the received kernel coefficients, and at the same time, transmit the received kernel coefficients to the NC located in the lower row.

The instruction memory 130 stores instructions to be performed by the plurality of NCs included in the core array 110. Then, in synchronization with the inputted features, the instruction memory 130 may transmit the stored instruction to the delay chain 140. Then, in the delay chain 140, one instruction is delayed by a specific delay unit. Instructions with a particular delay time generated by the delay chain 140 may be provided to different NCs. Any one instruction INS provided from the instruction memory 130 may be sequentially provided to the plurality of NCs with a specific delay time. The unit in which the delayed instruction is provided may be a row unit of the NC.

The feature memory 150 stores an input image or data to be processed by the image recognition processor 100. The input image to be recognized is stored in the feature memory 150 and transmitted to the core array 110. For example, the feature memory 150 may store image data provided from an image sensor. In addition, the feature memory 150 may store a feature map processed in one layer.

The functional safety processor core 160 may detect whether a recognition error occurs by receiving a result of an operation performed in the core array 110. For example, the functional safety processor core 160 may compare the outputs of a plurality of NCs using the same input feature, the same instruction, and the same kernel coefficient. For example, NCs may be divided into different groups, and each group may be controlled to perform the same pattern recognition operation. Then, the recognition results outputted from each group may be compared by the functional safety processor core 160. If it is detected that there is a difference in the pattern recognition result of each of the groups performing the same operation, the functional safety processor core 160 will determine that there is a recognition error. However, if it is detected that the output of each of the NC groups performing the same operation is the same, the functional safety processor core 160 will determine that there is no recognition error. Furthermore, in a case where a recognition error is not large enough, even if a recognition error exists, the functional safety processor core 160 may apply a fault tolerance function.

In particular, the functional safety processor core 160 may include a plurality of processors that perform the same operation. The plurality of processors may be provided with independent clock signals and driving voltages. The functional safety processor core 160 using independent clock signals and drive voltages may be free from common cause faults such as power sources or clock sources. Through this configuration, the functional safety processor core 160 may provide error detection and fault tolerance functions of a high reliability.

The bus 170 provides a data transfer path between the functional safety processor core 160, the kernel memory 120, the instruction memory 130, and the feature memory 150.

In the above, the structure of the image recognition processor of the inventive concept has been briefly described. The functional safety processor core 160 of the inventive concept may compare the results of operations performed by a plurality of NCs, and identify the recognition error. In addition, if the fault tolerance function is applied by applying a certain margin according to the degree of the recognized recognition error, the reliability of the image recognition processor of the inventive concept may be improved.

Figure 2:
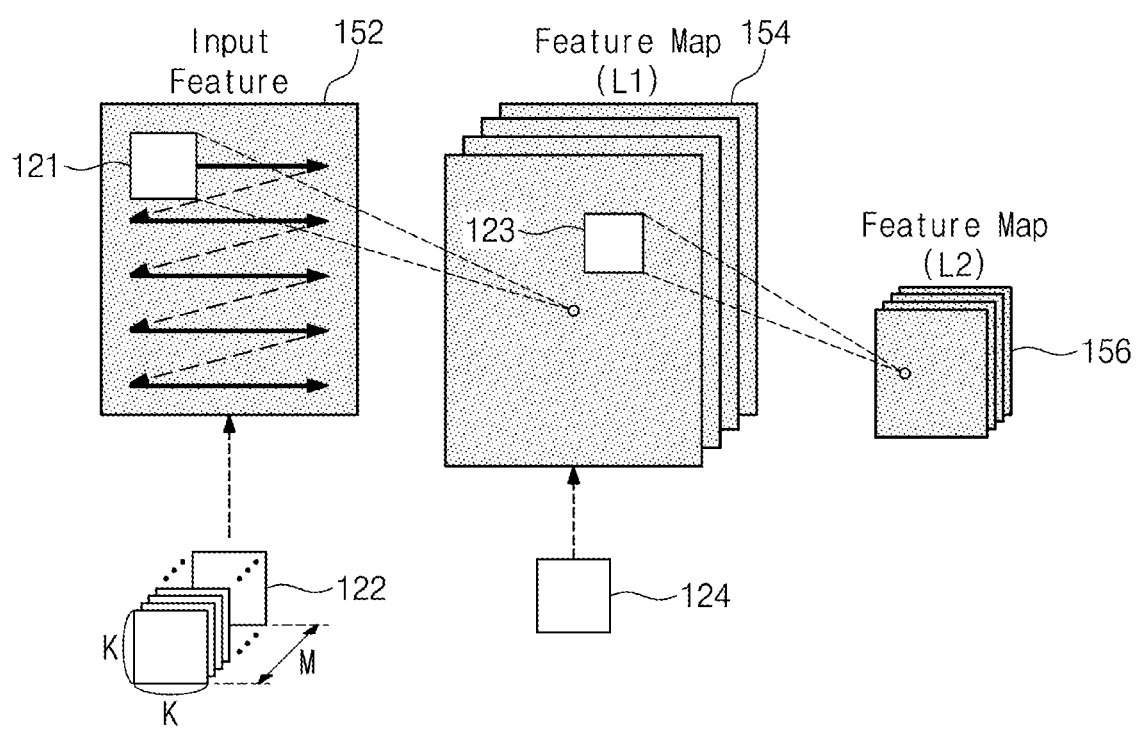
FIG. 2 is a view briefly illustrating an image recognition process performed in a core array of the inventive concept.

FIG. 2 is a diagram briefly showing an example of a convolution operation performed by NCs according to an embodiment of the inventive concept. Referring to FIG. 2, the input feature 152 is generated as the feature map 154 by a convolution operation. Then, the feature map 154 may be outputted as the feature maps 156 by a pulling operation.

The input feature 152 is converted into the feature map 154 in an array form by convolution operations with the kernel 121. When adding the values of the elements generated through the convolution of the position overlapping the input feature 152 and the kernel 121, a feature value corresponding to one point in the feature map 154 is generated. When performing a convolution operation while shifting the kernel 121 with respect to the positions of all the input features 152, one feature array may be generated. If such a convolution operation is performed using a plurality of kernels 122 (e.g., M kernels), a plurality of feature maps 154 (e.g., M feature maps) may be generated.

Here, the input feature 152 processed through the convolution operation may be substantially divided into various components. For example, one input feature 152 may be divided into image data representing color and contrast for each of the RGB components. In addition, the input feature 152 may be divided into data having a variable size. A processing unit that performs a convolution operation using all the kernels 122 (e.g., M kernels) of these various image data will be hereinafter referred to as a convolution loop. These convolution loops will be executed by a plurality of depths of the input feature 152.

In addition, a convolution operation using another kernel 124 for the feature map 154 may be followed. The feature map 154 may be generated through this convolution operation on any one input feature 152.

NCs included in the core array 110 of the inventive concept may process these operations in a parallel processing manner. Alternatively, the NCs may be driven in a manner of processing one input image in parallel by applying different kernels. Alternatively, the NCs may be divided into groups, and each group may process pattern recognition operations for the same input feature (frame data) or different input features. In each case, the functional safety processor core 160 may compare operation results, detect the presence of a recognition error, or perform a fault tolerance function of a predetermined margin.

Figure 3:
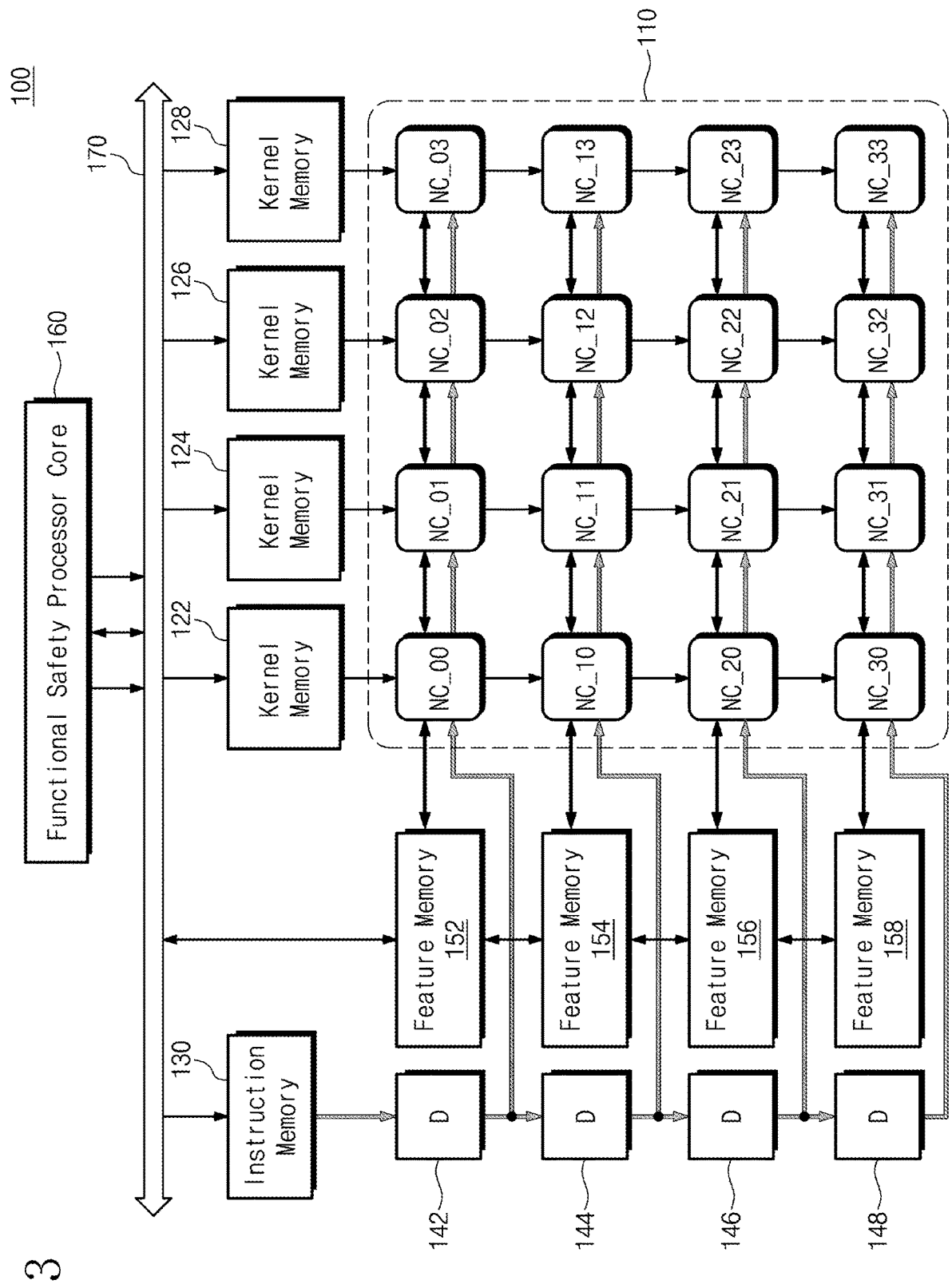
FIG. 3 is a block diagram specifically illustrating a structure of an image recognition processor according to an embodiment of the inventive concept.

FIG. 3 is a block diagram showing in detail the configuration of an image recognition processor of the inventive concept. Referring to FIG. 3, the core array 110, the kernel memory 120, the delay chain 140, and the feature memory 150 may each include a plurality of sub-elements.

The core array 110 may include a plurality of NCs (NC_xy, 0≤x, y≤3) arranged in rows and columns by way of example. The NCs NC_xy may each perform a convolution operation for pattern recognition using input instructions, data, and kernel coefficients. The NCs NC_xy may perform processing on the provided input features in a parallel processing method or a sequential processing method.

One NC NC_xy may be provided from the instruction memory 130 or may receive instructions from an adjacent NC NC_x(y−1) in the left direction. Then, the NC NC_xy may receive an input feature from any one of the feature memories 152, 154, 156, and 158 or from an adjacent NC NC_x(y−1) in the left direction. In addition, the NC NC_xy may receive a kernel coefficient for operation from any one of the kernel memories 122, 124, 126, and 128 or from an adjacent NC (NC_(x−1) y) in an upward direction.

In addition, the NC NC_xy may perform an operation corresponding to the provided instruction using the received input feature and the kernel coefficients. While simultaneously performing the operation according to the instruction, the NC NC_xy transmits the input feature to the NC on the right NC_x(y+1), and transmits the kernel coefficient received from the upper side to the NC NC_(x+1)y adjacent to the lower side.

In addition, the NC NC_xy transmits the performance result of the operation to either the adjacent NC NC_x(y−1) in the left direction or the feature memories 152, 154, 156, and 158. For example, the NC NC_01 transmits the results of operations using input features and kernel coefficients to the NC NC_00 in the same row. In addition, the NC NC_01 may receive the operation result of the NC NC_02 and transmit the operation result to the NC NC_00. In this manner, the NC NC_00 transmits its operation result and the operation result of the NCs NC_01, NC_02, and NC_03 included in the same row to the feature memory 152, respectively.

According to the above-described scheme, the plurality of NCs NC_xy included in one row may perform a convolution operation on one input feature using coefficients corresponding to different kernels. That is, the plurality of NCs NC_xy may process a plurality of convolution operations on one input feature using a plurality of different kernels. Then, the operation result of each of the NCs NC_xy may be compared or evaluated by any one of the feature memories 152, 154, 156, and 158 or by the functional safety processor core 160.

In the manner described above, in response to an instruction from the delay circuit 144, the NCs NC_0y (0≤y≤3) process the input features provided from the feature memory 154 using the kernel coefficients provided through the upper NC_0y (0≤y≤3). That is, the NCs NC_1y (0≤y≤3) perform an operation on the input feature provided from the feature memory 154 and transmit it to the feature memory 154.

The NCs NC_2y (0≤y≤3), which constitute one row in the core array 110, transmits the operation result to the feature memory 156. In the same manner, the NCs NC_3y (0≤y≤3) will perform an operation using the input feature and kernel coefficients from the feature memory 158 and transmit it to the feature memory 158.

Each of the feature memories 152, 154, 156, and 158 may receive a pattern recognition operation result transmitted from the NCs NC_xy and transmit the result to the functional safety processor core 160 through the bus 170. In addition, the feature memories 152, 154, 156, and 158 may provide the NCs NC_xy with an input feature provided by the functional safety processor core 160.

The functional safety processor core 160 may determine whether a recognition error exists by comparing operation results of each of the plurality of NCs NC_xy included in one row. Alternatively, the functional safety processor core 160 may determine whether a recognition error exists by comparing operation results of a plurality of NCs NC_xy by each row unit. In addition, even if an error exists in the result of the pattern recognition operation but the error is less than a predefined reference value, the functional safety processor core 160 may apply a fault tolerance function.

In particular, the functional safety processor core 160 of the inventive concept may include a plurality of processors capable of performing the same operation. The plurality of processors may be provided with independent clock signals and driving voltages. The functional safety processor core 160 using independent clock signals and drive voltages may be free from common cause faults such as power sources or clock sources.

Figure 4:
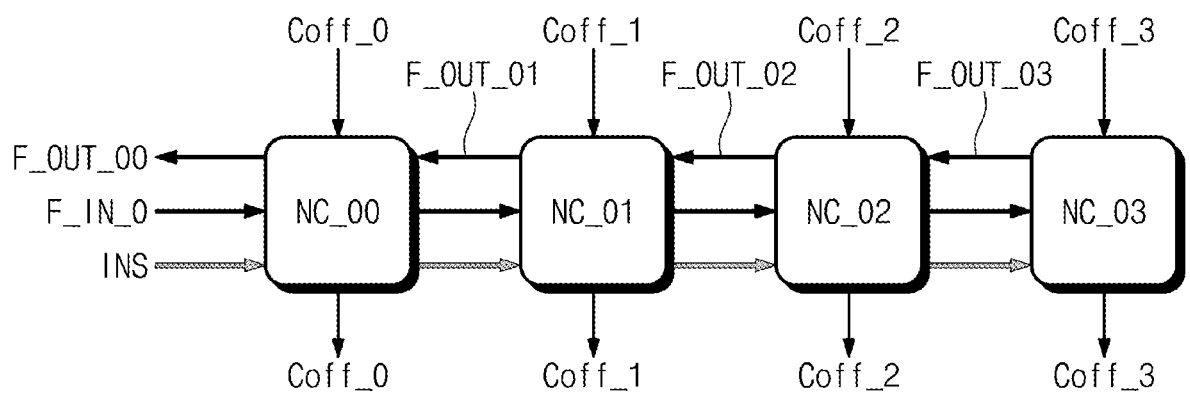
FIG. 4 is a diagram briefly showing data transmission in nano cores of the inventive concept.

FIG. 4 is a view briefly showing the operation of NCs in a row unit according to an embodiment of the inventive concept. Referring to FIG. 4, detailed operations of the NCs NC_0y (0≤y≤3) provided with input features from the feature memory 152 will be briefly described.

The NC NC_00 will receive the instruction INS outputted from delay circuit 142. Then, the NC NC_00 receives the input feature F_IN_0 from the feature memory 152 with the reception of the instruction INS, and receives the kernel coefficient Coff_0 from the kernel memory 122. The NC NC_00 performs an operation using the input feature F_IN_0 and the kernel coefficient Coff_0 in response to the instruction INS. For example, the NC NC_00 may perform a convolution operation on the input feature F_IN_0 by using a kernel corresponding to the kernel coefficient Coff_0. At the same time, NC NC_00 will transmit the kernel coefficient Coff_0 transmitted from kernel memory 122 to the NC NC_10 located in the same column. In addition, the NC NC_00 will transmit the input feature F_IN_0 transmitted from the feature memory 152 to the adjacent NC NC_01 in the row direction.

The NC NC_01 receives the input feature F_IN_0 and the instruction INS transmitted through the NC NC_00. Then, the NC NC_01 receives the kernel coefficient Coff_1 from the kernel memory 124. The NC NC_01 may perform a convolution operation using the input feature F_IN_0 and the kernel coefficient Coff_1 in response to the instruction INS. In addition, the NC NC_01 will transmit the kernel coefficient Coff_1 transmitted from the kernel memory 124 to the NC NC_11 located in the same column. In addition, the NC NC_01 transmits the input feature F_IN_0 and the instruction INS transmitted through the NC NC_00 to the adjacent NC NC_02 in the row direction.

The NC NC_02 receives an input feature F_IN_0 and an instruction INS transmitted through the NC NC_01. The NC NC_02 receives the coefficient Coff_2 from the kernel memory 126. The NC NC_02 may perform a convolution operation using the input feature F_IN_0 and the kernel coefficient Coff_2 in response to the instruction INS. In addition, the NC NC_02 will transmit the kernel coefficient Coff_2 transmitted from the kernel memory 126 to the NC NC_12 located in the same column. In addition, the NC NC_02 transmits the input feature F_IN_0 and the instruction INS transmitted through the NC NC_01 to the adjacent NC NC_03 in the row direction.

The NC NC_03 receives the input feature F_IN_0 and the instruction INS transmitted through the NC NC_02. The NC NC_03 receives the kernel coefficient Coff_3 from the kernel memory 128. The NC NC_03 may perform a convolution operation using the input feature F_IN_0 and the kernel coefficient Coff_3 in response to the instruction INS. In addition, the NC NC_03 will transmit the kernel coefficient Coff_3 transmitted from the kernel memory 128 to the NC NC_13 located in the same column. Since the NC NC_03 is the last right core of the row, the transmission operation of the instruction INS or the input feature F_IN_0 may not be performed.

The NC NC_03 will transmit the operation result F_OUT_03 to the NC NC_02 on the left side. The NC NC_02 transmits its calculation result F_OUT_02 and the calculation result F_OUT_03 provided from the right NC NC_03 to the left NC NC_01. The NC NC_01 transmits its operation result F_OUT_01 and the operation results F_OUT_02 and F_OUT_03 provided from the right NCs NC_02 and NC_03 to the left NC NC_00. Eventually, the NC NC_00 will transmit its operation result F_OUT_00 and operation results F_OUT_01, F_OUT_02, F_OUT_03 provided from the right NCs NC_01, NC_02, NC_03 to the feature memory 152. The operation results F_OUT_00, F_OUT_01, F_OUT_02, and F_OUT_03 transmitted to the feature memory 152 may be transmitted to the functional safety processor core 160.

In the above, the input/output relations of the instructions, input features, coefficients, and operation results of the plurality of NCs NC_00, NC_01, NC_02, NC_03 that receive the input feature F_IN_0 from the feature memory 152 have been briefly described. Like the NCs NC_00, NC_01, NC_02 and NC_03 constituting the first row of the core array 110, the NCs NC_10, NC_11, NC_12 and NC_13 may be driven in the same manner except that only the input features are different. It may be regarded that the NCs NC_20, NC_21, NC_22, and NC_23 and the NCs NC_30, NC_31, NC_32, and NC_33 that constitute one row also differ only in the feature memory provided with the input feature but operate in the same manner as the NCs NC_00, NC_01, NC_02, and NC_03. Of course, it will be understood that the timing of instruction transmission by the delay circuits 142, 144, 146, and 148 or the timing of the transmission of instructions, input features, and coefficients occurring in the respective cores may be different.

Figure 5:
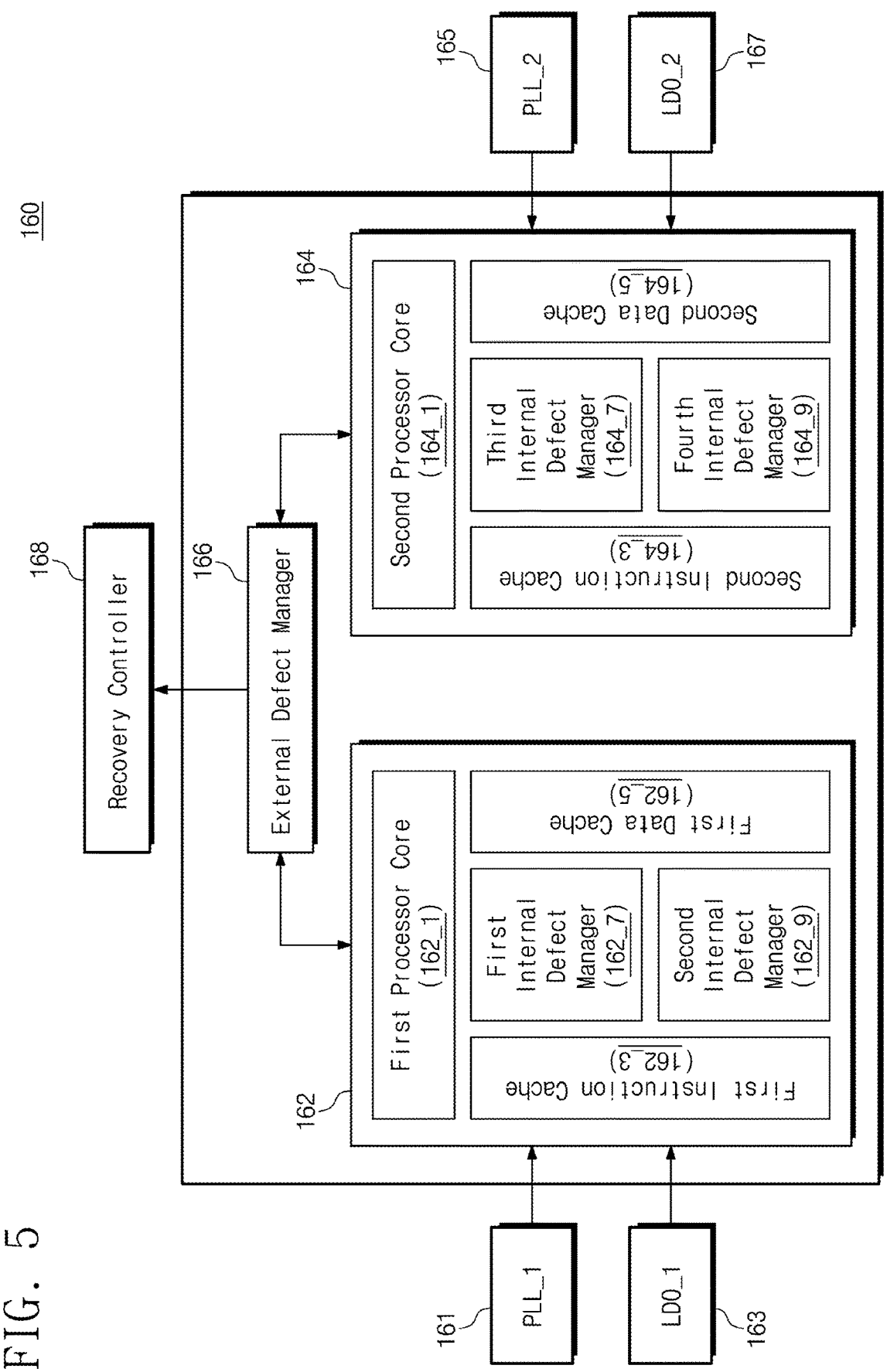
FIG. 5 is a block diagram exemplarily illustrating a configuration of a functional safety processor core of FIG. 3.

FIG. 5 is a block diagram illustrating a detailed configuration of a functional safety processor core of FIG. 3. Referring to FIG. 5, the functional safety processor core 160 may be provided in a multi-core structure. That is, the functional safety processor core 160 may include a first processor 162, a second processor 164, an external defect manager 166, and a recovery controller 168. In addition, the functional safety processor core 160 may include a first phase locked loop 161, a second phase locked loop 165, a first low dropout (LDO) 163, and a second LDO 167.

The first phase locked loop 161 and the second phase locked loop 165 are provided as separate clock generation circuits. The first phase locked loop 161 may provide the first driving clock CLK1 to the first processor 162. The second phase locked loop 165 may provide the second driving clock CLK2 to the second processor 164. Each of the first and second driving clocks CLK1 and CLK2 is a clock signal provided from an independent source from which mutual interference or influence is blocked. Therefore, even if the first driving clock CLK1 is exposed to noise or interference, the second driving clock CLK2 may maintain a normal frequency or phase. It will be understood that the first phase locked loop 161 and the second phase locked loop 165 may be implemented with various circuits that generate a clock not in a phase locked loop (PLL) scheme.

The first LDO 163 and the second LDO 167 may be provided as independent power supply circuits. The first LDO 163 generates a first driving voltage VDD1 and provides it to the first processor 162. The second LDO 167 generates a second driving voltage VDD2 and provides it to the second processor 164. Accordingly, the first and second driving voltages VDD1 and VDD2 are independent power supply voltages from which mutual interference or influence is blocked. For example, each of the first LDO 163 and the second LDO 167 may be provided as a voltage regulator that operates independently of each other. Alternatively, each of the first LDO 163 and the second LDO 167 may be provided as a power management integrated circuit (PMIC) that operates independently of each other. Therefore, even if the first driving voltage VDD1 fluctuates due to noise or interference, the second driving voltage VDD2 may maintain a normal level. Here, it will be understood that each of the first and second driving voltages VDD1 and VDD2 may be provided as the same level voltage or a different level voltage.

According to the first processor 162 and the second processor 164 using clock signals and driving voltages independent of each other, they may be free from a common cause fault such as a driving voltage or a clock signal.

The first processor 162 and the second processor 164 may each process the same task. The first processor 162 and the second processor 164 compare the results of operations performed in the core array 110 (see FIG. 1), which are transmitted through the feature memory 150, respectively. The operation result transmitted through the feature memory 150 is identically transmitted to the first processor 162 and the second processor 164. Then, the first processor 162 and the second processor 164 may determine whether there is an error in the core array 110 by comparing operation results transmitted independently from each other.

In addition, the external defect manager 166 may compare the error detection results of the first processor 162 and the second processor 164 with each other to determine whether a defect or an error exists. The first processor 162 and the second processor 164 will perform the same task and transmit the result to the external defect manager 166. Then, the external defect manager 166 may detect the transient fault or the permanent fault by comparing the processing results of the first processor 162 and the second processor 164 at each specific checkpoint.

The recovery controller 168 performs various control operations for recovering the detected error by referring to the detection result of the internal defect managers 162_7, 162_9, 164_7, and 164_9 or the external defect manager 166. The recovery controller 168 may correct or recover a detected error based on error trap information from at least one of the internal defect managers 162_7, 162_9, 164_7, and 164_9, for example. The recovery controller 168 may perform an error or defect recovery operation based on the error trap information provided from the external defect manager 166.

The first processor 162 may include a first processor core 162_1, a first instruction cache 162_3, a first data cache 162_5, a first internal defect manager 162_7, and a second internal defect manager 162_9. The first processor core 162_1 performs various operations based on instructions and data provided through the first instruction cache 162_3 and the first data cache 162_5 in the first processor 162. In particular, the first internal defect manager 162_7 may detect and recover errors or defects occurring in the first instruction cache 162_3. The second internal defect manager 162_9 may detect or recover errors or defects occurring in the first data cache 162_5.

The second processor 164 may include a second processor core 164_1, a fourth instruction cache 164_3, a second data cache 164_5, a third internal defect manager 164_7, and a fourth internal defect manager 164_9. The second processor core 164_1 performs various operations based on instructions and data provided through the second instruction cache 164_3 and the second data cache 164_5 in the second processor 164. In particular, the third internal defect manager 164_7 may detect and recover errors or defects occurring in the second instruction cache 164_3. The fourth internal defect manager 164_9 may detect or recover errors or defects occurring in the second data cache 164_5.

The functional safety processor core 160 having the above-described configuration and functions may receive a result of an operation processed by the plurality of NCs to detect whether a recognition error occurs. In particular, the first processor 162 and the second processor 164 are driven by independent clock signals CLK1 and CLK2 and driving voltages VDD1 and VDD2, respectively. Accordingly, the first processor 162 and the second processor 164 may be free from a common cause fault resulting from the driving voltage or the clock signal, respectively. Thus, operational reliability of the functional safety processor core 160 may be provided.

Figure 6:
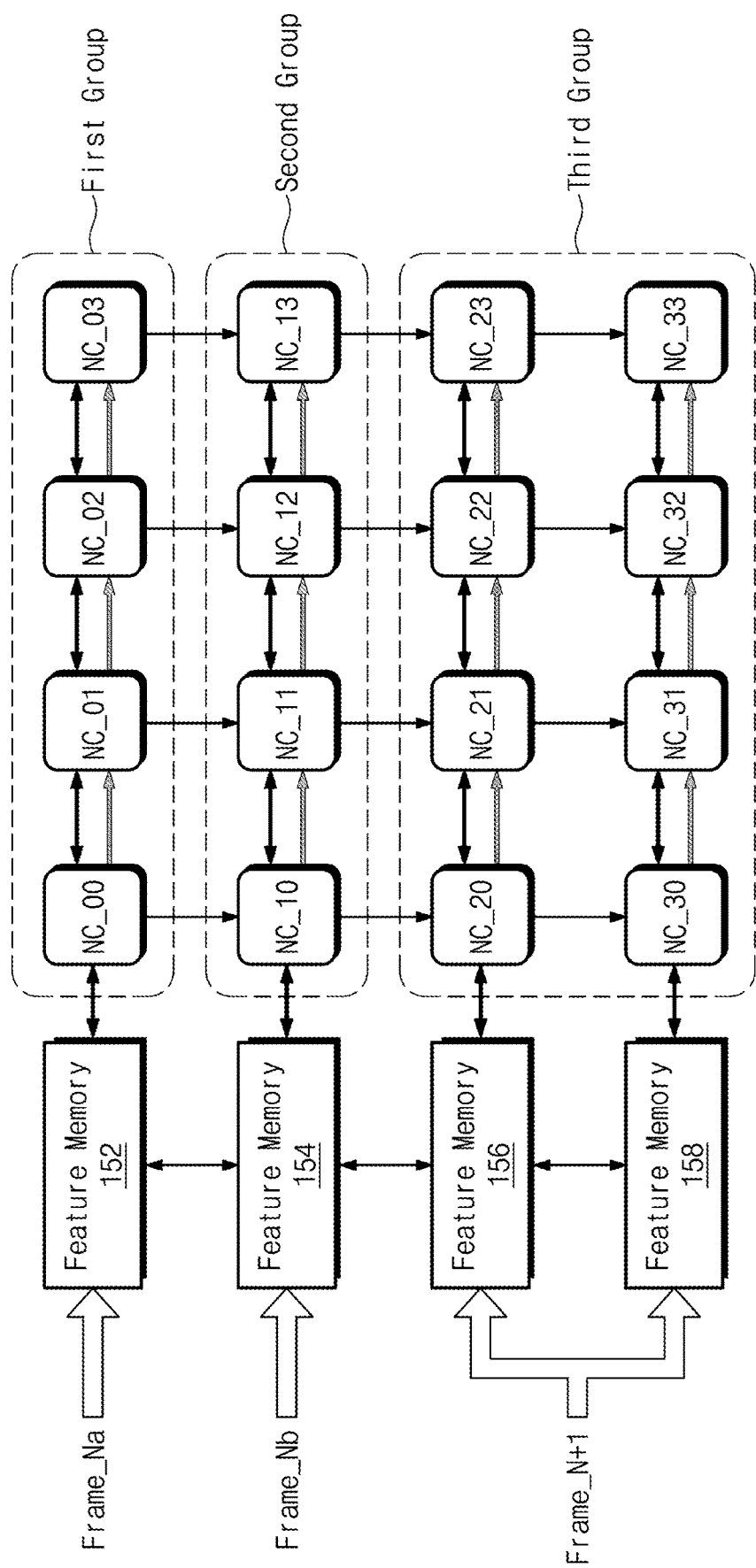
FIG. 6 is a diagram exemplarily illustrating a grouping method of nano cores for detecting a recognition error.

FIG. 6 is a block diagram illustrating a unit of error detection performed by the functional safety processor core of FIG. 5. Referring to FIG. 6, NCs may be divided into a plurality of groups. Each group may be controlled to process the same frame. Alternatively, each group may be controlled to process different frames.

For example, the NCs NC_00, NC_01, NC_02, and NC_03 located in the first row of the core array 110 may be classified into the first group, and the NCs NC_10, NC_11, NC_12, and NC_13 located in the second row may be classified into a second group. The NCs NC_20, NC_21, NC_22, NC_23, NC_30, NC_31, NC_32, and NC_33 located in the third and fourth rows may be classified into a third group.

Based on the group classification described above, a pattern recognition operation for the first frame Frame_N may be allocated to the NCs of the first group and the second group. That is, input features of the first frame Frame_Na may be transmitted to the NCs NC_00, NC_01, NC_02, and NC_03 of the first group through the feature memory 152. In addition, input features of the first frame Frame_Nb may be transmitted to the second group of NCs NC_10, NC_11, NC_12, and NC_13 through the feature memory 154. Here, it means that the frames Frame_Na and Frame_Nb are the same frame data but are allocated to different NC groups.

Then, a pattern recognition operation for the second frame Frame_N+1 may be allocated for the NCs of the third group located in the third and fourth rows of the core array 110. That is, the input feature of the second frame Frame_N+1) different from the first frame Frame_Na or Frame_Nb may be transmitted to the NCs NC_20, NC_21, NC_22, NC_23, NC_30, NC_31, NC_32, and NC_33 of the third group through the feature memories 156 and 158.

The functional safety processor core 160 may determine an error of the pattern recognition operation by comparing operation results outputted from the NCs of the first group and the second group. Then, when an error occurs, any one of the operation results of each of the first frames Frame_Na or Frame_Nb may be selected as a result of pattern recognition by calculating a difference value from the previous frame Frame_N−1.

FIG. 7 is a flowchart briefly illustrating an operation of a functional safety processor core according to an embodiment of the inventive concept. Referring to FIG. 7, a method in which the functional safety processor core 160 processes one frame Frame_N is illustrated. The functional safety processor core 160 allocates pattern recognition of the current frame image Frame_N to the NCs of the first group and the second group, respectively. Then, the functional safety processor core 160 may compare the processing result of the pattern recognition to determine the presence of an error and to select an optimal result.

In operation S110, the functional safety processor core 160 identically allocates the current frame image Frame_N to a plurality of NC groups. For example, the functional safety processor core 160 may simultaneously allocate the current frame image Frame_N to two NC groups. Then, the functional safety processor core 160 may receive a processing result on the allocated frame image Frame_N from two NC groups.

In operation S120, the functional safety processor core 160 compares the processing results transmitted from each of the two NC groups. That is, the functional safety processor core 160 may compare the processing result R(Frame_Na) of the frame image Frame_N of the first group of NCs with the processing result R(Frame_Nb) of the frame image Frame_N of the second group of NCs. If the processing results are the same (Yes direction), the procedure moves to operation S140. On the other hand, if the processing result is different (No direction), the procedure moves to operation S130.

In operation S130, the functional safety processor core 160 calculates a difference value [R(Frame_Na)−R(Frame_N−1)] between the processing result R(Frame_Na) of the first group on the current frame image Frame_N and the processing result R(Frame_N−1) on the previous frame. Then, the functional safety processor core 160 compares the calculated difference value with the reference value Ref. If the difference value [R(Frame_Na)−R(Frame_N−1)] is not smaller than the reference value Ref (No direction), the procedure moves to operation S150. On the other hand, if the difference value [R(Frame_Na)−R(Frame_N−1)] is smaller than the reference value Ref (Yes direction), the procedure moves to operation S140.

In operation S140, the functional safety processor core 160 selects a processing result R(Frame_Na) of the first group as a result of the image recognition operation. Subsequently, the procedure moves to operation S170 to perform a process for processing the next frame Frame_N+1.

In operation S150, the functional safety processor core 160 calculates a difference value [R(Frame_Nb)−R(Frame_N−1)] between the processing result R(Frame_Nb of the second group and the processing result R(Frame_N−1) on the previous frame. Then, the functional safety processor core 160 compares the calculated difference value with the reference value Ref. If the difference value [R(Frame_Nb)−R(Frame_N−1)] is not smaller than the reference value Ref (No direction), the procedure moves to operation S180. On the other hand, if the difference value [R(Frame_Nb)−R(Frame_N−1)] is smaller than the reference value Ref (Yes direction), the procedure moves to operation S160.

In operation S160, the functional safety processor core 160 selects a processing result R(Frame_Nb) of the second group as a result of the image recognition operation. Subsequently, the procedure moves to operation S170 to perform a process for processing the next frame Frame_N+1.

In operation S180, the functional safety processor core 160 determines that an error occurs in the image recognition operation for the current frame Frame_N. Then, the functional safety processor core 160 may perform an additional error recovery operation according to the determination result.

The image recognition processor according to an embodiment of the inventive concept described above may reduce the possibility of malfunction due to a temporary error or a permanent error occurring in a process of processing a sensor device or sensor data. Therefore, it is expected to prevent semiconductor malfunction due to the recognition rate limitation of the sensor data in the image recognition processor.

In the above, the error detection operation by the functional safety processor core 160 of the inventive concept has been briefly described. However, it will be understood that the above examples are merely examples for explaining the advantages of the inventive concept and various modifications may be made without departing from the spirit of the inventive concept.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. An image recognition processor comprising:
   a plurality of nano cores arranged in rows and columns and configured to perform a pattern recognition operation on an input feature using a kernel coefficient in response to each instruction;
   an instruction memory configured to provide the instruction to each of the plurality of nano cores;
   a feature memory configured to provide the input feature to each of the plurality of nano cores;
   a kernel memory configured to provide the kernel coefficients to the plurality of nano cores; and
   a functional safety processor core configured to receive a result of a pattern recognition operation outputted from the plurality of nano cores to detect the presence of a recognition error, and perform a fault tolerance function on the detected recognition error,
   wherein the functional safety processor core comprises:
   a first processor driven by a first driving voltage and a first driving clock; and
   a second processor driven by a second driving voltage and a second driving clock and configured to perform the same task as the first processor,
   wherein each of the first driving voltage and the second driving voltage is supplied from mutually independent voltage regulators, and each of the first driving clock and the second driving clock is provided from mutually independent clock generators.

2. The image recognition processor of claim 1, wherein the functional safety processor core comprises:
   a first LDO configured to provide the first drive voltage; and
   a second LDO configured to provide the second drive voltage.

3. The image recognition processor of claim 1, wherein the functional safety processor core comprises:
   a first phase locked loop configured to provide the first drive clock; and
   a second phase locked loop configured to provide the second drive clock.

4. The image recognition processor of claim 1, wherein the functional safety processor core further comprises:
   an external defect manager configured to compare the processing results of the first processor and the second processor to detect whether an error or a defect is present; and
   a recovery controller configured to recover the detected error or defect.

5. The image recognition processor of claim 1, wherein the first processor comprises:
   a first processor core configured to perform a requested operation;
   a first instruction cache configured to provide an instruction inputted to the first processor core;
   a first data cache configured to provide cache data to the first processor core;
   a first internal defect manager configured to manage an error in the first instruction cache; and
   a second internal defect manager configured to manage an error in the first data cache.

6. The image recognition processor of claim 1, wherein the second processor comprises:
   a second processor core configured to perform a requested operation;
   a second instruction cache configured to provide an instruction inputted to the second processor core;
   a second data cache configured to provide cache data to the second processor core;
   a third internal defect manager configured to manage an error in the second instruction cache; and
   a fourth internal defect manager configured to manage an error in the second data cache.

7. The image recognition processor of claim 1, wherein the functional safety processor core allocates an input feature corresponding to a current frame to nano cores of each of the first and second groups among the plurality of nano cores, and compares operation results of each of the first group and the second group.

8. The image recognition processor of claim 7, wherein if a first recognition result outputted from the first group and a second recognition result outputted from the second group are the same, the functional safety processor core selects any one of the first recognition result and the second recognition result as an output value.

9. The image recognition processor of claim 8, wherein if the first recognition result and the second recognition result are different, the functional safety processor core select any one of the first recognition result and the second recognition result as an output value by referring to a third recognition result corresponding to a result of a recognition operation on a previous frame.

10. The image recognition processor of claim 9, wherein the functional safety processor core selects any one having a smaller difference from the third recognition result from the first recognition result and the second recognition result.

11. The image recognition processor of claim 10, wherein when each of a difference value between the first recognition result and the third recognition result and a difference value between the second recognition result and the third recognition result is not smaller than a reference value, the functional safety processor core determines as a recognition error.

12. An operating method of an image recognition processor comprising a plurality of nano cores, the method comprising:
   allocating a current frame image to a nano core of a first group and a nano core of a second group among the plurality of nano cores;
   comparing a first recognition result outputted by the nano cores of the first group with a second recognition result outputted by the nano cores of the second group;
   if the first recognition result and the second recognition result are the same, selecting the first recognition result as a recognition result of the current frame image; and if the first recognition result and the second recognition result are different, determining the difference as a fault tolerance or a recognition error by referring to a difference value of a third recognition result corresponding to a recognition result value for a previous frame and each of the first recognition result and the second recognition result.

13. The method of claim 12, wherein the determining of the difference as the fault tolerance or the recognition error further comprises comparing a first difference value between the first recognition result and the third recognition result and a second difference value between the second recognition result and the third recognition result with a reference value.

14. The method of claim 13, wherein when each of the first difference value and the second difference value is smaller than the reference value, selecting any one having a smaller difference from the reference value among the first recognition result and the second recognition result as a fault tolerance value.

15. The method of claim 13, wherein when each of the first difference value and the second difference value is not smaller than the reference value, determining as a recognition error.

* * * * *